United States Patent [19]
Dawson, Jr.

[11] Patent Number: 5,720,090
[45] Date of Patent: Feb. 24, 1998

[54] MACHINING APPARATUS WITH MODULAR MACHINE TOOLS

[75] Inventor: Howard J. Dawson, Jr., Naples, Fla.

[73] Assignee: Prestige Cabinetry and Finishings, Inc., Ft. Myers, Fla.

[21] Appl. No.: 633,513

[22] Filed: Apr. 17, 1996

[51] Int. Cl.$^6$ .................................................... B23B 7/04
[52] U.S. Cl. ..................... 29/40; 29/35.5; 29/39; 29/53; 29/55; 408/35; 476/54
[58] Field of Search ..................... 476/54; 408/35; 29/40, 39, 36, 35.5, 53, 55

[56] References Cited

U.S. PATENT DOCUMENTS

| | | | |
|---|---|---|---|
| 246,366 | 8/1881 | Borchardt | 476/54 |
| 463,790 | 11/1891 | Quint et al. | |
| 542,694 | 7/1895 | Stover et al. | |
| 542,695 | 7/1895 | Stover et al. | |
| 583,883 | 7/1897 | Baldwin | |
| 595,850 | 12/1897 | Flickinger | |
| 934,407 | 7/1909 | Larson | |
| 1,302,271 | 4/1919 | Anderson | |
| 2,685,122 | 8/1954 | Berthiez | 29/39 |
| 2,767,598 | 3/1952 | Burg | 74/665 |
| 3,003,165 | 10/1961 | Charlat | 408/35 |
| 3,183,729 | 5/1965 | Tyler | 476/54 |
| 3,200,492 | 8/1965 | Lejmkuhl | 29/568 |
| 3,203,071 | 8/1965 | Uchida et al. | 29/36 |
| 3,218,875 | 11/1965 | Myard | 476/33 |
| 3,256,600 | 6/1966 | Swanson et al. | 483/66 |
| 3,323,384 | 6/1967 | Wodarka | 476/54 |
| 3,344,512 | 10/1967 | Zucchellini | 483/66 |
| 3,635,569 | 1/1972 | Sato et al. | 408/35 |
| 4,053,968 | 10/1977 | Johnson et al. | 483/56 |
| 4,240,194 | 12/1980 | Inami et al. | 29/568 |
| 4,270,400 | 6/1981 | Fodor | 74/194 |
| 4,304,040 | 12/1981 | Staiger et al. | 29/26 A |
| 4,304,154 | 12/1981 | Townend | 74/796 |
| 4,305,306 | 12/1981 | Adams | 476/54 |
| 4,593,731 | 6/1986 | Tanaka | 29/40 |
| 4,597,144 | 7/1986 | Frank et al. | 29/40 |
| 4,614,020 | 9/1986 | Kawada et al. | 408/35 |
| 4,711,016 | 12/1987 | Genschow et al. | 29/568 |
| 4,819,494 | 4/1989 | Giuliani et al. | 74/190 |
| 4,887,345 | 12/1989 | Saito et al. | 29/568 |
| 5,289,860 | 3/1994 | Keusch | 408/35 |

FOREIGN PATENT DOCUMENTS

| | | | |
|---|---|---|---|
| 1013479 | 11/1947 | France | 408/35 |
| 2439042 | 4/1975 | Germany | 476/54 |
| 5-345525 | 12/1993 | Japan | 476/54 |
| 241 | 1/1865 | United Kingdom | 408/126 |

OTHER PUBLICATIONS

Czech Heavy Industries, No. 12, "A New NC 8–Station Turret Miller", Class 29, Subclass 40 1979.

*Primary Examiner*—Daniel W. Howell
*Assistant Examiner*—Christopher Kirkman
*Attorney, Agent, or Firm*—Cummings & Lockwood

[57] ABSTRACT

A machining apparatus is disclosed which includes a rotatable tool turret having a plurality of modular machine tools removably supported thereon in circumferentially spaced apart relationship, a transmission assembly for effectuating the indexed rotation of the tool turret, and a multi-disc variable-speed drive system for independently driving each of the modular machine tools supported on the tool turret.

30 Claims, 10 Drawing Sheets

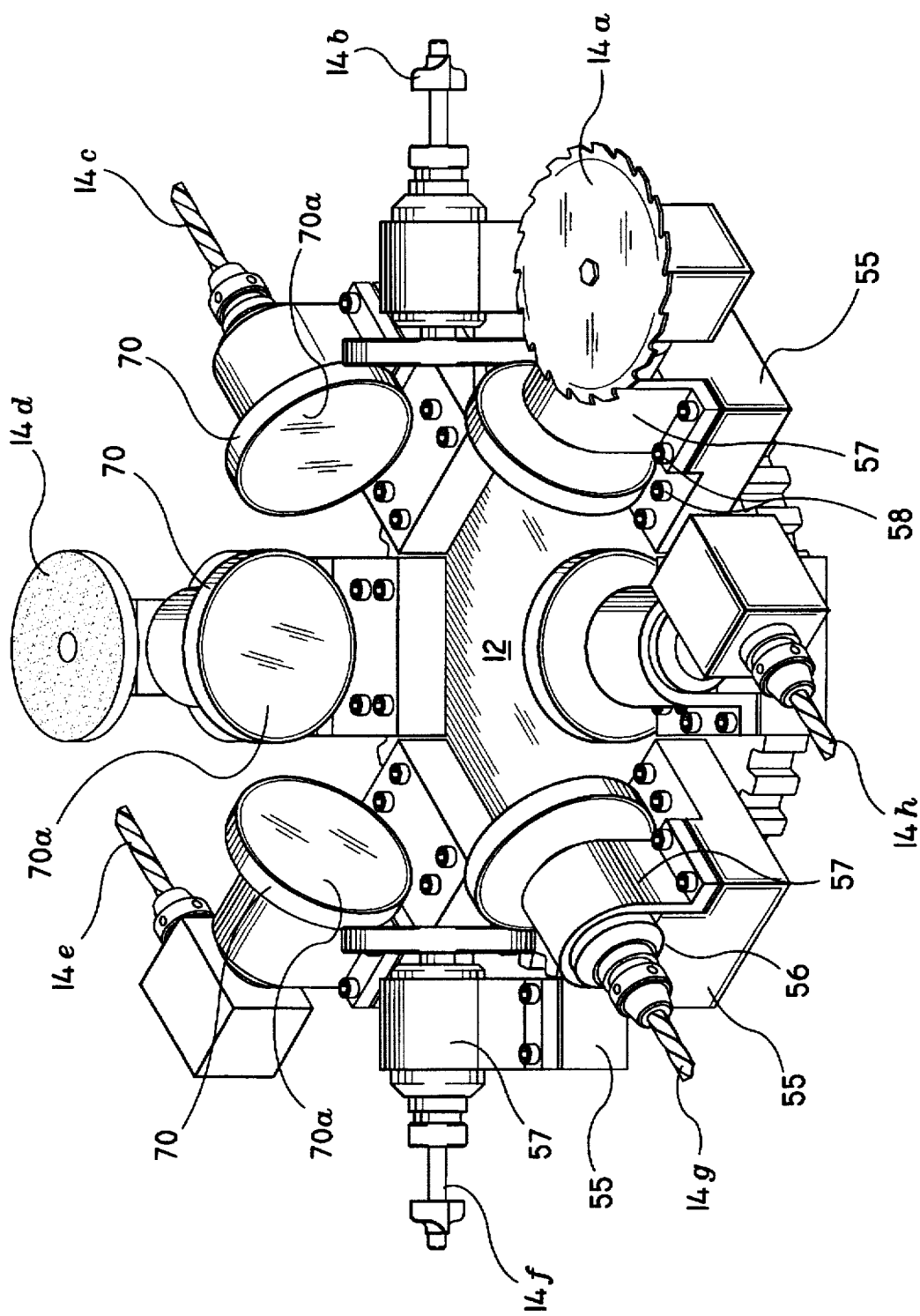

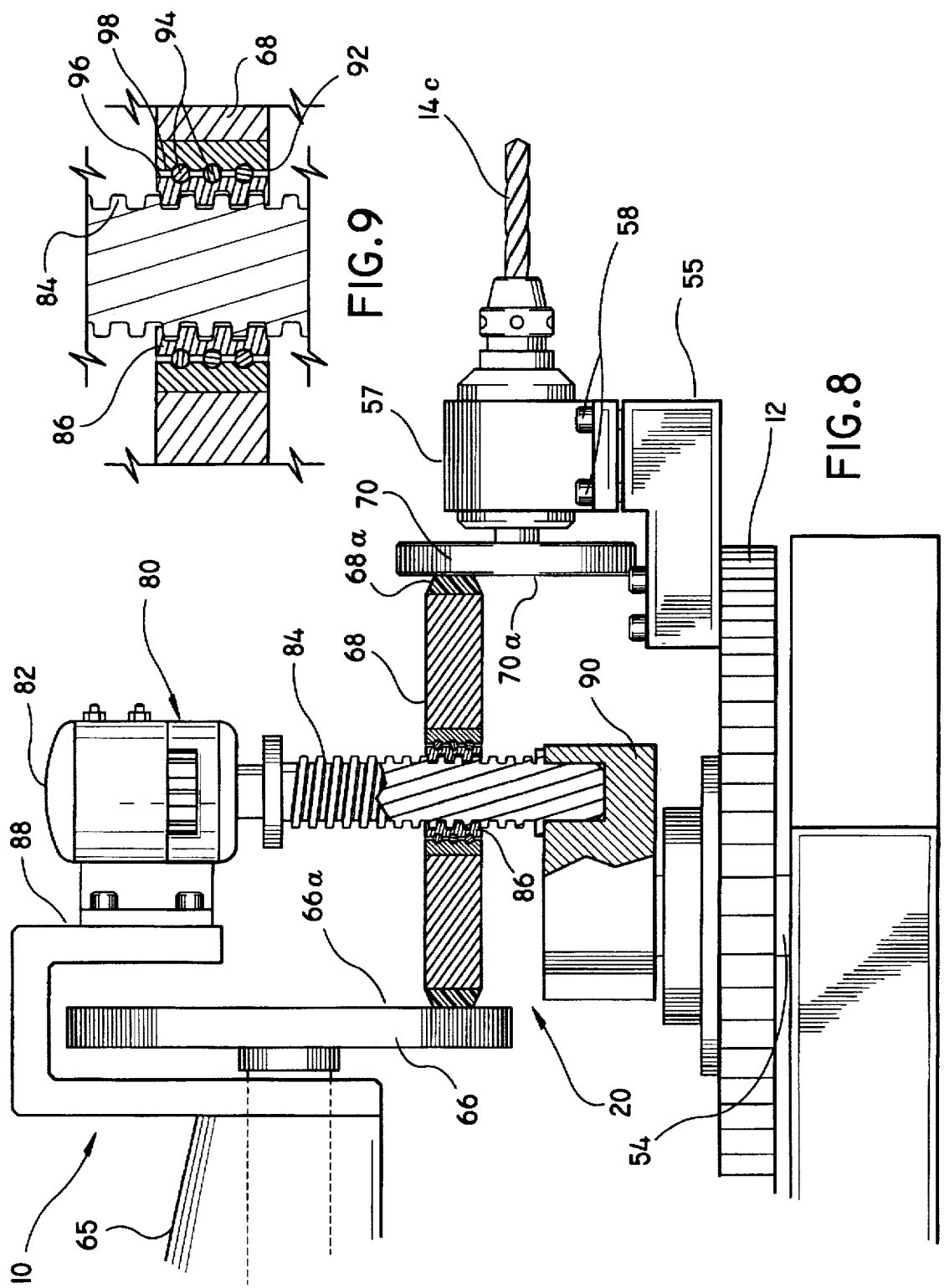

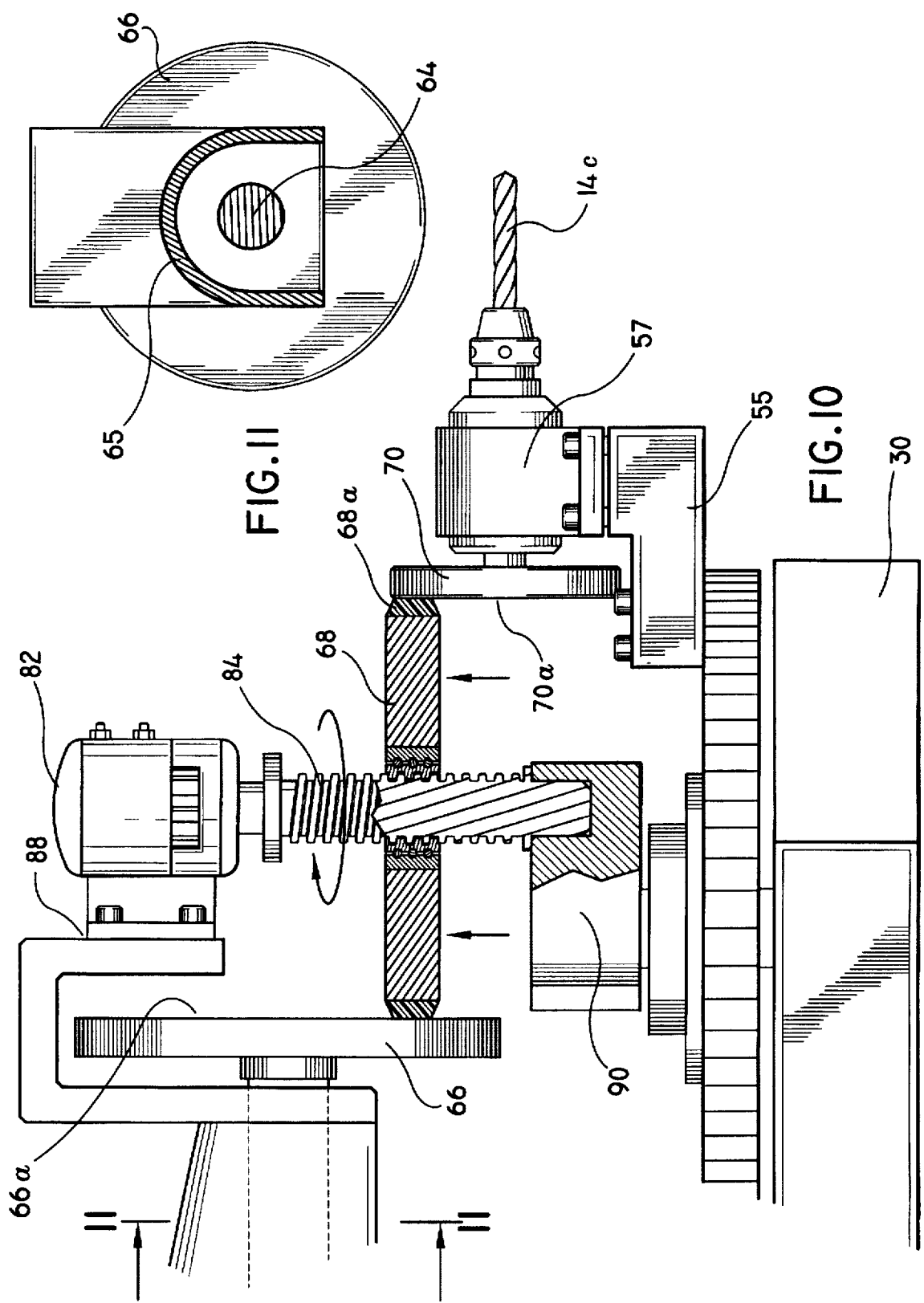

4:3 RATIO

2:5 RATIO

1:6 RATIO

5,720,090

MACHINING APPARATUS WITH MODULAR MACHINE TOOLS

BACKGROUND OF THE INVENTION

1. Field of the Invention

The subject invention is related to machine tools, and more particularly, to a machining apparatus having a plurality of modular machine tools supported on a rotating turret and a system for driving each of the machine tools.

2. Background of the Related Art

Various approaches and techniques have been utilized to develop machine tools that would be highly efficient in large-scale manufacturing. One approach is to construct machines from basic modular units that accomplish a particular function rather than produce a specific part. These units are often referred to as self-contained power-head production machines. Such machines are generally connected to one another by automatic transfer devices which move work pieces from one station to the next.

Transferring is usually accomplished by one of four methods. In one method, work pieces are pulled along supporting rails by means of an endless chain which moves intermittently as required. In another method, work pieces are pushed along continuous rails by air or hydraulic pistons. A third method involves moving workpieces by an overhead chain conveyor which lifts the work from one station and deposits it at another. A fourth method, utilized when only a few operations are to be performed, employs a rotary indexing table to support the workpiece, and a plurality of machining heads or tools arranged radially about the table. The table may move continuously or intermittently to transfer the workpiece from one tool to another. In each of these transfer devices, means must be provided for accurately positioning the workpieces at each work station.

To overcome the need for such positioning means, machines have been constructed with rotating turrets which support a number of tool heads adjacent a working surface. In use, a workpiece is positioned on the working surface and the turret is selectively rotated to move a particular tool head into alignment with the work piece. Early examples of this type of machine are disclosed in U.S. Pat. No. 463,790 to Quint and U.S. Pat. No. 542,695 to Stover et al., both of which are directed to drilling machines having multiple drill heads. A later machine disclosed in U.S. Pat. No. 2,767,598 to Burg includes a rotating turret which supports a plurality of drill presses and means for controlling the rotational speed of the rotary tool elements. The speed of the tool elements may be controlled either by adjusting the speed or the motor or by selecting between two pulley drives of different ratio.

A modern computer controlled machining apparatus having a rotating turret which supports a plurality of machine tools is presently manufactured by CMS North America, of Grand Rapids, Mich. Each machine tool is driven by a separate motor which is also supported on the turret. The speed of each tool element is varied by selectively varying the speed of the motor associated therewith. Consequently, at low tool speed, motor efficiency is necessarily below optimum.

A need exists for a machining apparatus with a rotary turret that supports a plurality of machine tools in such a manner so that all tools are driven by a single drive motor, and wherein the speed of each tool may be selectively varied without varying the speed of the drive motor, so that the drive motor may be continuously operated at peak horsepower.

SUMMARY OF THE INVENTION

The subject invention is directed to a highly efficient machining apparatus which includes an indexing tool turret mounted to rotate relative to a work holding platform. A plurality of machine tools are supported on the turret in circumferentially spaced apart relationship. Each machine tool is configured as a removable module and includes a respective driven member which is mounted to rotate relative to the tool turret.

The apparatus further includes a drive system including a primary drive member driven by a main drive motor, and a secondary drive member configured to transmit rotational motion from the primary drive member to the driven member of a selected one of the machine tools supported on the tool turret. Preferably, the secondary drive member is mounted to translate along an axis extending perpendicular to the axis of rotation of the primary drive member, relative to the selected driven member, while remaining in frictional contact therewith, to vary the rotational speed of the driven member.

A linear drive assembly is provided to effectuate the axial translation of the secondary drive member relative to the selected driven member and the primary drive member. Preferably, the linear drive assembly includes an axial drive screw and a drive motor to effectuate the rotation of the drive screw. In use, the rotational speed of a selected one of the driven members will decrease with respect to the rotational speed of the primary drive member as the secondary drive member translates radially outwardly from the axis of rotation of the driven member. Conversely, the rotational speed of a selected one of the driven members will increase with respect to the rotational speed of the primary drive member as the secondary drive member translates radially inwardly from a peripheral edge of the driven member. Accordingly, the speed of a selected driven member can be varied during a machining operation without effecting the operating efficiency of the main drive motor.

The machining apparatus of the subject invention further includes a transmission assembly for effectuating the indexed rotation of the tool turret relative to the work holding platform, to align a selected one of the machine tools therewith and consequently engage a corresponding one of the driven members with the secondary drive member. The transmission assembly preferably includes a series of intermeshed gears which are operatively connected to the tool turret and a stepper motor for driving the gears.

A wide variety of machine tools may be employed with the machining apparatus of the subject invention. For example, the apparatus may include sanding tools, routing tools, sawing tools, or drilling tools. Preferably, each machine tool is configured as an independent modular unit which is removably mounted on the tool turret utilizing a standardized mounting assembly. Accordingly, the tool modules may be interchanged or rearranged on the tool turret depending upon the machining operation to be performed.

The subject invention is further directed to a drive assembly for a machine which includes a primary chive member operatively connected to a drive motor and mounted to rotate about a first axis of rotation, a driven member mounted to rotate about a second axis of rotation which is parallel to the first axis of rotation, and a secondary drive member configured to transmit rotational motion from the primary drive member to the driven member, wherein the secondary drive member is mounted to translate along an axis extending perpendicular to the first and second axes of rotation, while remaining in frictional contact with the primary drive member and the driven member, to vary the rotational speed of the driven member. Preferably, the primary drive member comprises a first disc having an annular planar contact surface, the secondary drive member comprises a second disc having a circumferential peripheral contact surface, and the driven member comprises a third disc having an annular planar contact surface.

Further features of the machining apparatus of the subject invention will become more readily apparent from the following detailed description taken in conjunction with the drawings.

BRIEF DESCRIPTION OF THE DRAWINGS

So that those having ordinary skill in the art to which the subject invention appertains will more readily understand how to construct and use the machining apparatus described herein, preferred embodiments of the apparatus will be described in detail hereinbelow with reference to the drawings wherein:

FIG. 7 is a perspective view of the tool turret separated from the machining apparatus of FIG. 2 to better illustrate the driven disc of each machine tool module supported thereon;

FIG. 8 is a side elevational view of the multi-disc drive system of the machining apparatus of FIG. 2 with the intermediate drive disc and associated drive screw shown in partial cross-section for ease of illustration;

FIG. 9 is an enlarged localized view of the bearing assembly associated with the intermediate drive disc and drive screw illustrated in FIG. 8;

FIG. 10 is a side elevational view of the drive assembly of the machining apparatus of FIG. 2 with the intermediate drive disc advanced from the position shown in FIG. 8 to vary the rotational speed of the driven disc;

FIG. 11 is a cross-sectional view taken along line 11—11 of FIG. 10 illustrating the geometric configuration of the protective shroud of the main drive shaft; and FIGS. 12–14 are schematic representations of the multi-disc drive system of the machining apparatus of the subject invention, depicting in sequential order, the axial translation of the intermediate drive disc with respect to the driven disc to vary the relative rotational speeds thereof wherein:

FIG. 12 illustrates the intermediate drive disc positioned adjacent the outer periphery of the driven disc;

FIG. 13 illustrates the intermediate drive disc positioned between the outer periphery and the rotational axis of the driven disc; and FIG. 14 illustrates the intermediate drive disc positioned adjacent the rotational axis of the driven disc.

DETAILED DESCRIPTION OF THE PREFERRED EMBODIMENTS

Figure 1:
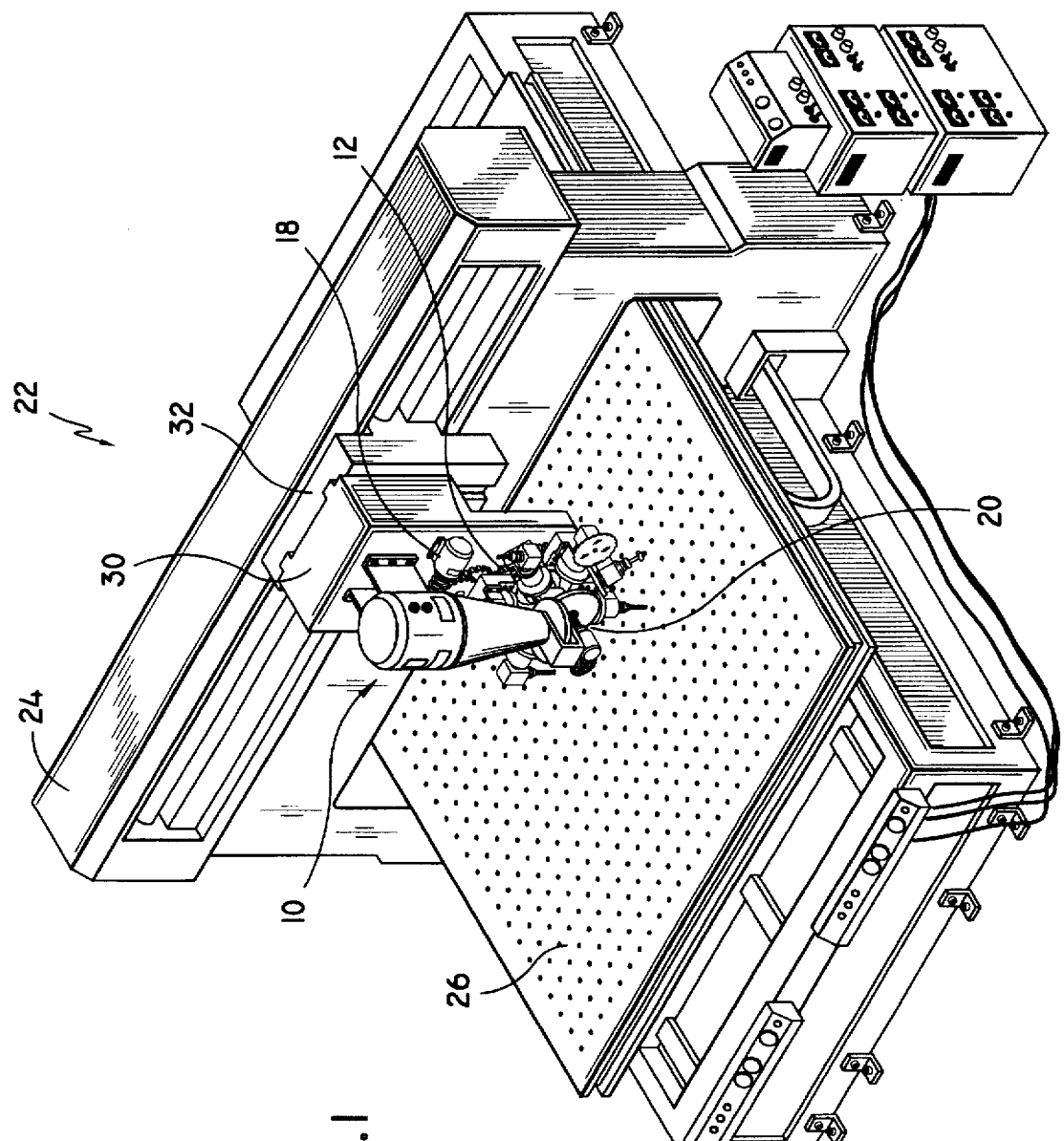
FIG. 1 is a perspective view of a work station employing a machining apparatus constructed in accordance with a preferred embodiment of the subject invention.
Figure 2:
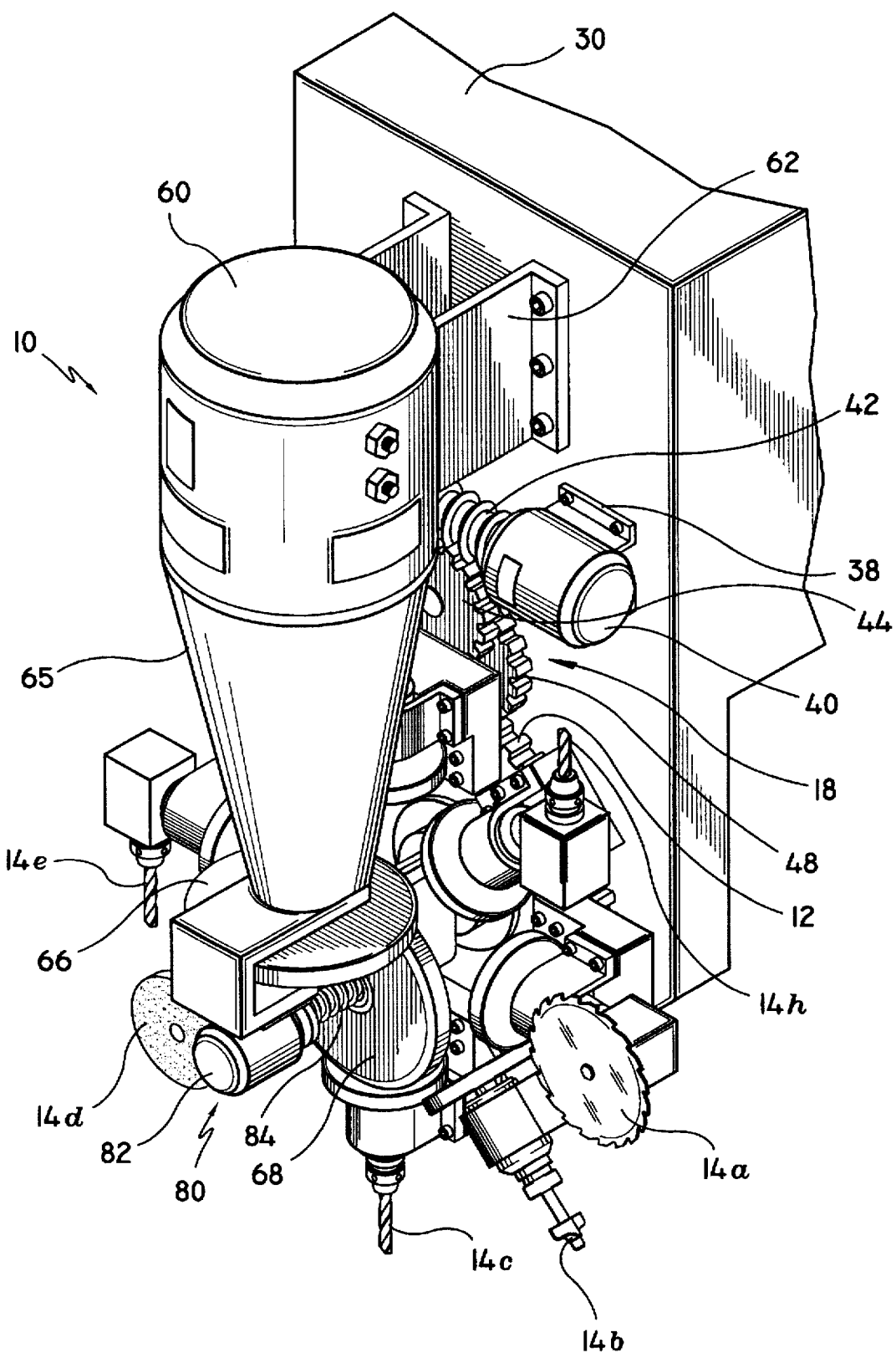
FIG. 2 is a perspective view of the machining apparatus of the subject invention.
Figure 3:
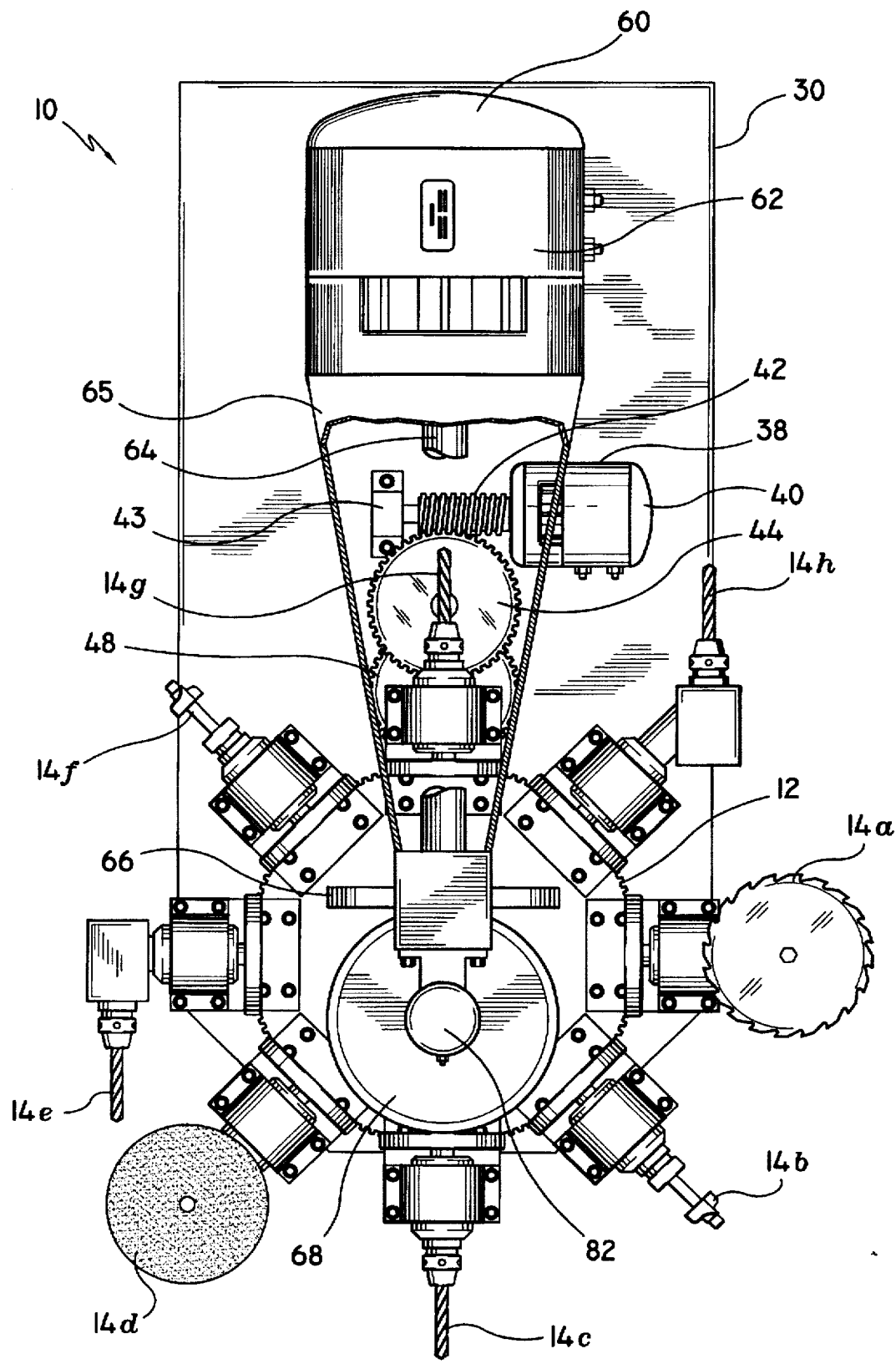
FIG. 3 is a front elevational view of the machining apparatus of FIG. 2 illustrating the plurality of machine tool modules associated therewith.

Referring now to the drawings wherein like reference numerals identify similar structural elements of the subject invention, a machining apparatus constructed in accordance with a preferred embodiment of the subject invention is illustrated in FIG. 1 and is designated generally by reference numeral 10. In brief, machining apparatus 10 includes a rotatable tool turret 12 having a plurality of modular machine tools 14a–14h removably supported thereon (see FIG. 3). A transmission assembly 18 is provided for effectuating the rotation of tool turret 12 and a multi-disc variable-speed drive system 20 is provided for independently driving each of the modular machine tools supported on the tool turret.

Referring now in detail to FIG. 1, machining apparatus 10 is preferably employed in conjunction with a computer controlled automated work station 22 having a superstructure 24 and a work holding platform 26 associated therewith. The work holding platform defines a planar work surface configured to support a workpiece, such as, for example, a piece of woodwork. The work surface may include conventional work holding fixtures, such as, for example, clamping devices, or it may be configured as a vacuum table (as shown) which utilizes suction to maintain a particular workpiece in a desired location with respect to the machining apparatus.

With continuing reference to FIG. 1, machining apparatus 10 includes a main support housing 30 mounted on a carriage 32 which is adapted to translate along a horizontal axis relative to work holding platform 26. Preferably, support housing 30 is mounted to translate relative to carriage 32 along a vertical axis with respect to work holding platform 26 to increase the operating range of the apparatus. Tool turret 12, the components of transmission assembly 18, and the components of the multi-disc drive system 20 are supported on housing 30 and are discussed in greater detail hereinbelow.

Referring to FIGS. 2–6, the transmission assembly 18 of machining apparatus 10 includes a conventional stepper motor 40 secured to main support housing 30 by a mounting bracket 38. Stepper motor 40 drives a worm gear 42 supported in a journal bearing 43. Worm gear 42 is meshed with a main drive gear 44 which drives a subordinate coaxial pinion gear 46. Pinion gear 46 is meshed with a spur gear 48 which, in turn, is meshed with the circumferential teeth of tool turret 12. Drive gear 44 and pinion gear 46 are mounted on a common shaft 50 which depends from support housing 30, while spur gear 48 and tool turret 12 are mounted on parallel shafts 52 and 54, respectively. In operation, transmission assembly 18 effects the indexed rotation of tool turret 12, in clockwise and counter-clockwise directions, to align a selected one of the machine tools 14a–14h with work holding platform 26.

With continuing reference to FIGS. 2–6, the multi-disc drive system 20 of machining apparatus 10 is preferably powered by a main a drive motor 60 which is supported on a mounting bracket 62 secured to support housing 30. Alternative power sources may be employed, such as, for example, a combustion engine. A main drive shaft 64 extends from drive motor 60 along an axis which is perpendicular to the planar surface of work holding platform 26. Drive shaft 64 is enclosed within a generally U-shaped protective shroud 65 which depends from drive motor 60 (see FIG. 11).

Figure 4:
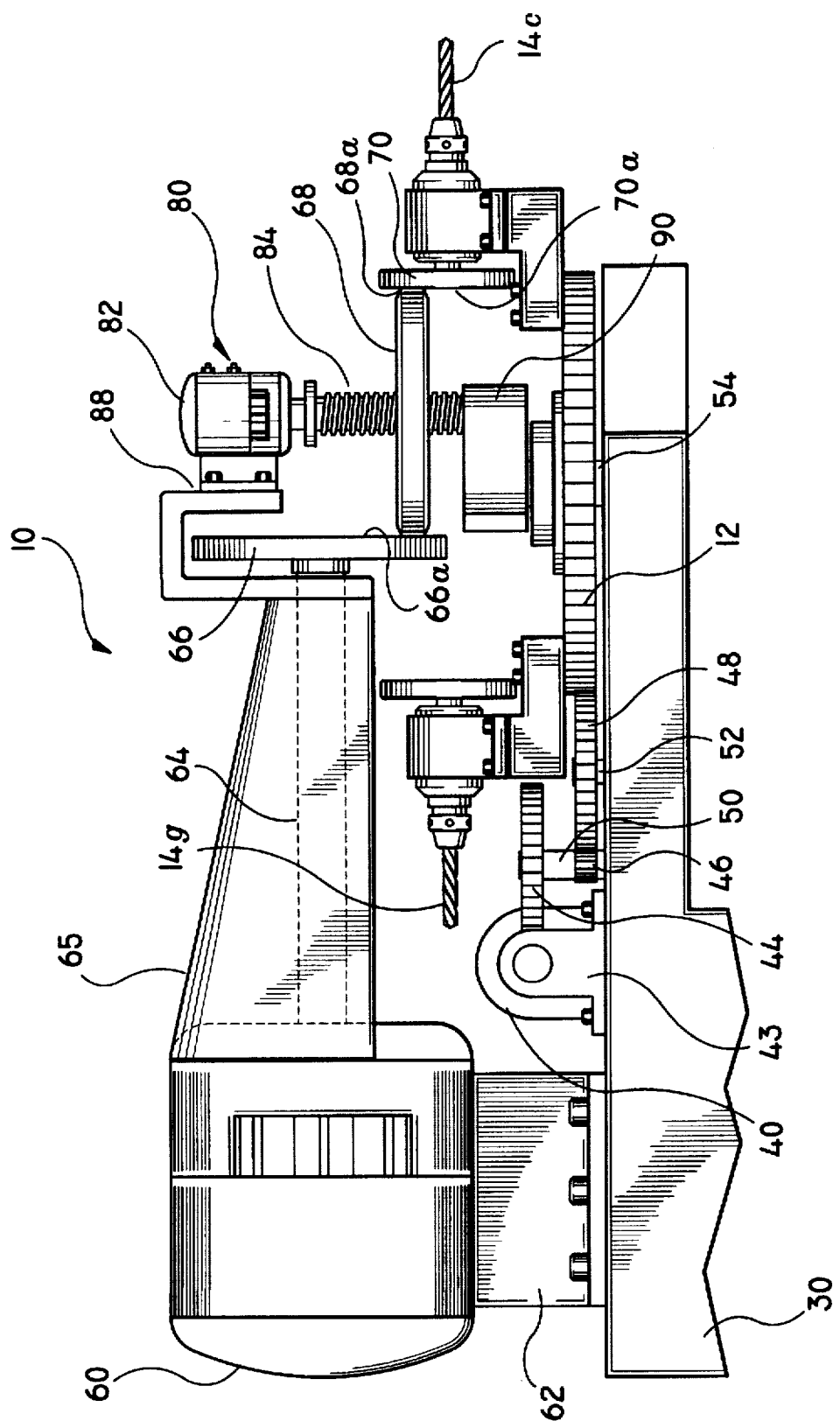
FIG. 4 is a side elevational view of the machining apparatus of FIG. 2 illustrating the components of the transmission assembly and drive system associated therewith.

As best seen in FIG. 4, drive system 20 includes a primary drive disc 66 having an annular planar contact surface 66a and mounted on the distal end of drive shaft 64. Drive disc 66 is positioned to deliver power to an intermediate drive disc 68 which is mounted for rotation about an axis extending perpendicular to the axis of drive shaft 64. Intermediate drive disc 68 has a circumferential peripheral contact surface 68a which preferably includes an elastomeric contact material configured to frictionally engage the annular contact surface 66a of primary drive disc 66. As discussed in greater detail hereinbelow, intermediate drive disc 68 is configured to transfer power from primary drive disc 66 to a selected one of the modular machine tools 14a–14h supported on the tool turret 12 of machining apparatus 10.

As illustrated in FIGS. 2–5, a plurality of machine tools 14a–14h are removably supported on tool turret 12 and are arranged in circumferentially spaced apart relationship. Preferably, tool turret 12 is configured to accommodate eight machine tools. However, the number of machine tools is limited only by the radial dimension of tool turret 12. For purposes of illustration, machining apparatus 10 is depicted with a rotary cutting saw 14a, two routing tools 14b and 14f, two axial drilling tools 14c and 14g, a rotary sanding tool 14d, a right angle drilling tool 14e, and an acute angle drilling tool 14h. It will be readily appreciated by those having ordinary skill in the art that the selection of machine tools supported on tool turret 12 will vary in dependence upon the machining operation or woodworking task to be performed. Furthermore, the machine tool modules can be selectively positioned with respect to one another to minimize machining time by reducing the travel distance of tool turret 12 between tool changes.

As best seen in FIG. 7, a standardized mounting assembly is employed to removably mount each tool module on tool turret 12. The mounting assembly includes a support base 55 having a concave reception seat 56 for receiving a tool module, and a U-shaped securement bracket 57 for securing the tool module in reception seat 56. Conventional threaded fasteners 58 are utilized to secure bracket 57 to support base 55, as well as to secure each support base in any one of the eight circumferentially arranged mounting positions on tool turret 12, as shown in FIG. 6.

Figure 5:
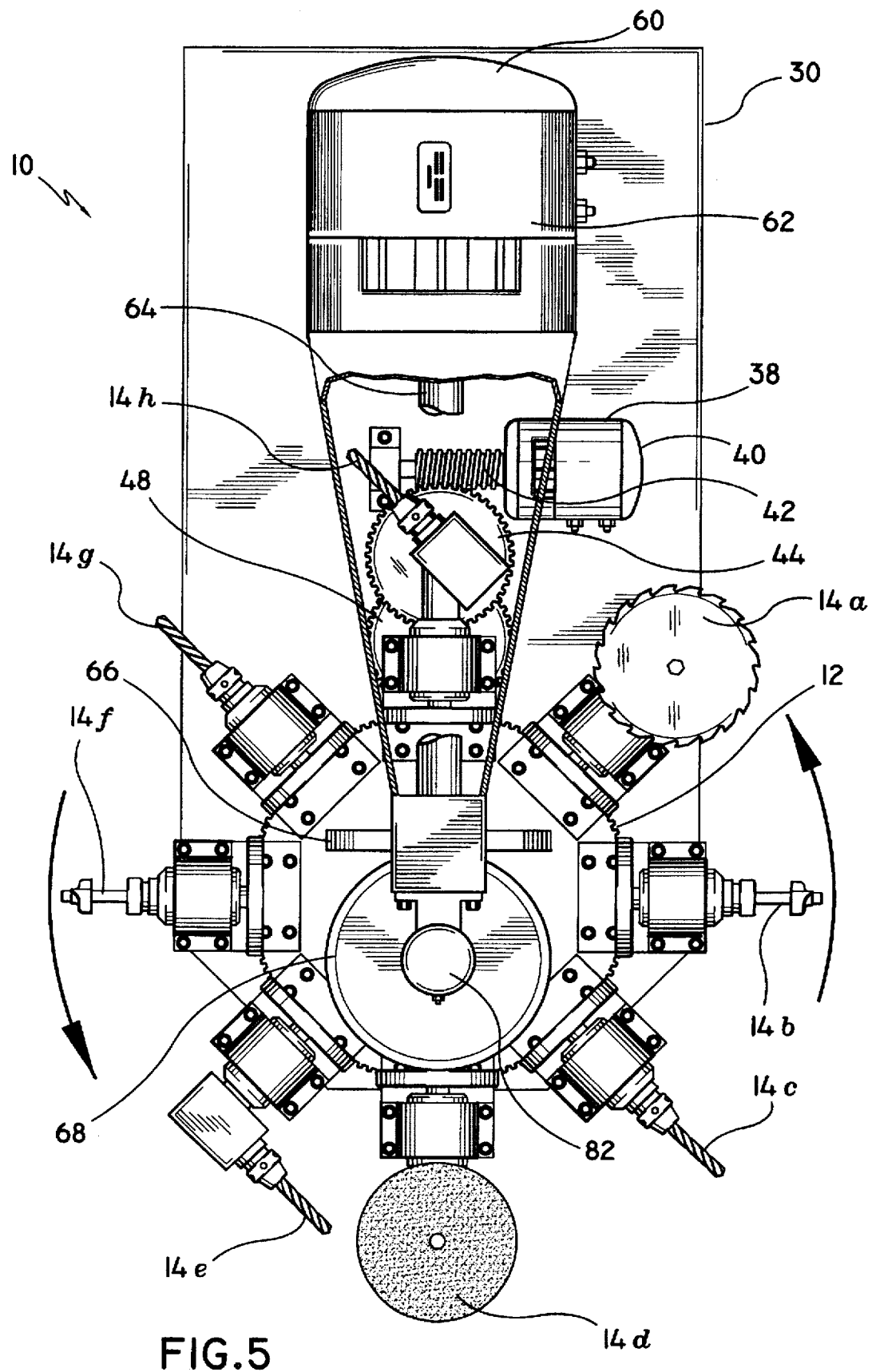
FIG. 5 is front elevational view of the machining apparatus of FIG. 2 with the tool turret rotated in a counter-clockwise direction from the position shown in FIG. 3.

Referring to FIGS. 5 and 7, each modular machine tool, regardless or type or configuration, includes an identical driven disc 70 mounted to rotate about an axis which is perpendicular to the axis of tool turret 12. Each driven disc 70 has an annular planar contact surface 70a configured to interact with the circumferential peripheral contact surface 68a of the intermediate drive disc 68 of drive system 20. Thus, in operation, when tool turret 12 is rotated by transmission assembly 18 to align a selected one of the machine tools 14a–14h with a workpiece positioned on work platform 26, the annular surface 70a of the selected driven disc 70 is moved into frictional engagement with the circumferential surface 68a of intermediate drive disc 68. Accordingly, the rotational motion of the primary drive disc 66 is transferred directly to the driven disc 70 via intermediate disc 68.

In addition to transferring rotational motion from the primary drive disc 66 to the driven disc 70 of a selected machine tool 14a–14h, the intermediate drive disc 68 is configured to vary the rotational speed of the driven disc 70 of a selected machine tool, and consequently, the operating speed of the rotating tool element associated therewith. More particularly, as illustrated in FIG. 8, intermediate drive disc 68 is mounted to translate relative to the primary drive disc 66 and the driven disc 70, while remaining in frictional contact with both, to vary the rotational speed of the driven disc 70.

Figure 6:
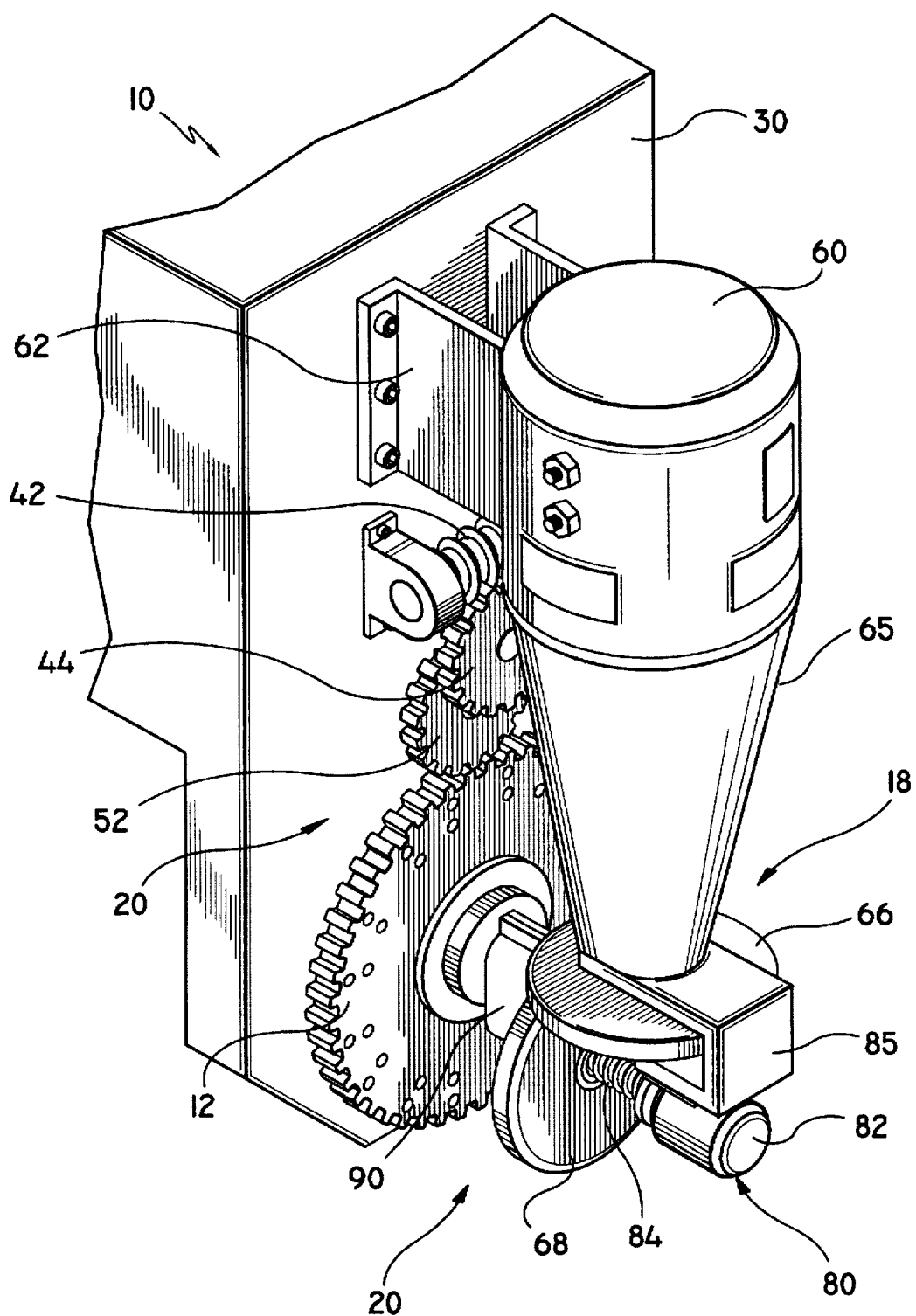
FIG. 6 is a perspective view of the machining apparatus of FIG. 2 with the machine tool modules removed from the turret to better illustrate the components of the transmission assembly.

Referring to FIG. 8 in conjunction with FIGS. 4 and 6, the axial translation of intermediate drive disc 68 is effectuated by a linear drive assembly 80 which includes a motor 82, an axial drive screw 84, and a threaded bearing collar 86. Motor 82 is supported on a mounting bracket 88 which depends from shaft shroud 65. Drive screw 84 extends from motor 82 and is rotatably supported in a journal bearing 90 mounted adjacent tool turret 12. Bearing collar 86 is threadably engaged on drive screw 84 and is seated within an axial aperture 92 defined in intermediate drive disc 68. As best seen in FIG. 9, a plurality of ball bearings 94 are disposed between the outer peripheral wall 96 of bearing collar 86 and the inner peripheral wall 98 of aperture 92 to facilitate the axial rotation of intermediate drive disc 68 as well as the linear translation thereof. Those skilled in the art will readily appreciate that alternative mounting arrangements may be utilized to facilitate the linear and rotational movements of intermediate drive disc 68 relative to drive screw 84.

As shown in FIGS. 8 and 10, when the driven disc 70 of one of the selected machine tools 14a–14h is rotated into frictional engagement with intermediate drive disc 68, the axis of rotation of the driven disc 70 is offset from the axis of rotation of the primary drive disc 66 by a predetermined distance. Preferably, the two discs are axially offset such that the peripheral edge of the primary drive disc 66 is aligned with the axis of the selected driven disc 70. The determination of this distance effects the speed ratios between drive disc 66 and the selected driven disc 70. It will be readily appreciated by those having ordinary skill in the art that the specific speed ratios between the drive disc and the driven disc will necessarily depend upon the relative size of each component in the multi-disc drive system.

Figure 12:
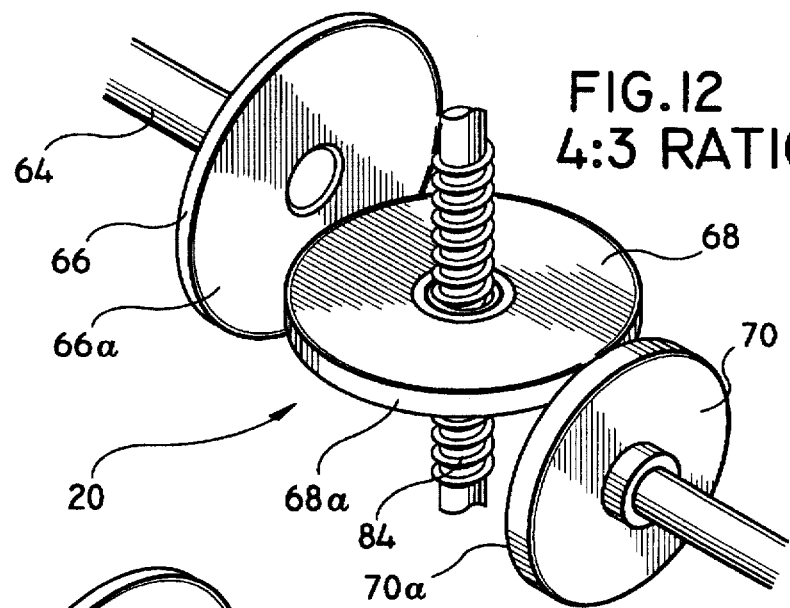
Figure 13:
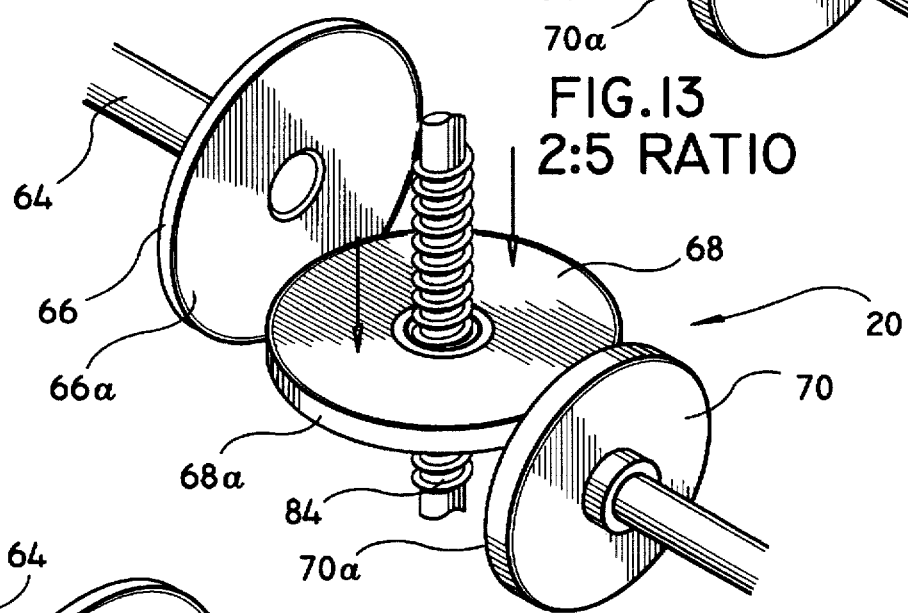
Figure 14:
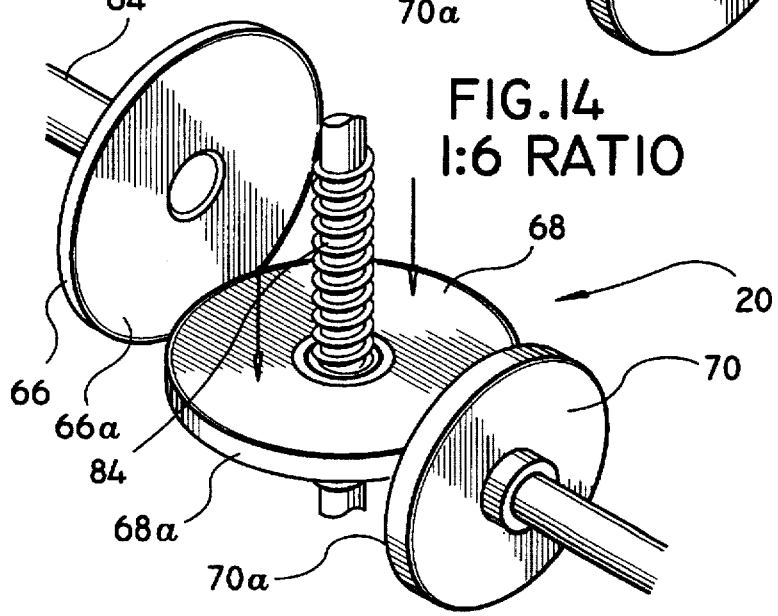

Referring to FIGS. 12–14, in use, the rotational speed of a selected driven disc 70 increases with respect to the rotational speed of the primary drive disc 66 as the secondary drive member 68 translates radially inwardly from the periphery of the driven disc toward the axis of rotation thereof. For example, in a preferred embodiment of the subject invention, when the peripheral contact surface 68a of intermediate drive disc 68 is in frictional contact with the outermost section of the annular contact surface 70a of driven disc 70, as illustrated in FIG. 12, the speed ratio between the drive disc 66 and the driven disc 70 is approximately 4:3. Conversely, when peripheral contact surface 68a is in frictional contact with the innermost section of annular contact surface 70a, as illustrated in FIG. 14, the speed ratio between the drive disc 66 and the driven disc 70 is approximately 1:6. As illustrated in FIG. 13, other speed ratios are achieved when intermediate drive disc 68 is in a location between the axis of rotation of driven disc 70 and the outer periphery thereof. Accordingly, the rotational speed of any driven disc, and consequently any rotating tool element associated therewith, can be selectively varied during a machining operation without effecting the operating efficiency of the main drive motor 60. Moreover, the main drive shaft 64 will remain in motion at all times during a machining operation, delivering peak horsepower to the primary drive disc 66 without interruption.

Although the machining apparatus of the subject invention has been described with respect to a preferred embodiment, it is apparent that modifications and changes can be made thereto without departing from the spirit and scope of the invention as defined by the appended claims. For example, it is envisioned that the frictional coupling arrangement between the primary drive disc and the driven disc could be replaced by an equivalent coupling arrangement, such as, a jaw-type coupling arrangement or a cup-type coupling arrangement. Furthermore, it is envisioned that the respective frictional contact surfaces of the primary drive disc, the intermediate drive disc, and the driven disc of each tool module, could have tapered geometries. In such an instance, the intermediate drive disc would be configured to translate on two distinct axes, one perpendicular to the axis of rotation of the primary drive disc and the other parallel to the axis of rotation of the primary drive disc.

What is claimed is:

1. A machining apparatus comprising:
   a) a supporting structure mounted adjacent a work holding platform;
   b) a turret operatively connected to said supporting structure and mounted to rotate about an axis extending parallel to said work holding platform;
   c) a primary drive member mounted to rotate about a fixed axis of rotation with respect to said supporting structure;
   d) a plurality of tool assemblies supported on said turret in circumferentially spaced apart relationship, each tool assembly having a respective driven member operatively connected thereto which is mounted to rotate about a respective axis of rotation relative to said turret;
   e) a secondary drive member operatively connected to said supporting structure and configured to transmit rotational motion between said primary drive member and a selected one of said driven members frictionally engaged with said secondary drive member, said secondary drive member mounted to translate along an axis extending perpendicular to the axis of rotation of said primary drive member;
   f) a transmission assembly for effectuating the rotation of said turret relative to said supporting structure to align a selected one of said tool assemblies with said work holding platform and consequently frictionally engage a corresponding one of said driven members with said secondary drive member; and
   g) a linear drive assembly for effectuating the axial translation of said secondary drive member relative to said selected driven member.

2. An apparatus as recited in claim 1, wherein said secondary drive member is mounted to translate relative to said selected driven member and said primary drive member, while remaining in frictional contact therewith, to vary the relative rotational speeds thereof.

3. An apparatus as recited in claim 2, wherein said secondary drive member is mounted to translate along an axis which is perpendicular to the axis of rotation of said primary drive member.

4. An apparatus as recited in claim 3, wherein the rotational speed of a selected one of said driven members decreases with respect to the rotational speed of the primary drive member as the secondary drive member translates radially outwardly from the axis of rotation of said driven member.

5. An apparatus as recited in claim 3, further comprising a linear drive assembly for effectuating the axial translation of said secondary drive member.

6. An apparatus as recited in claim 5, wherein said linear drive assembly includes an axial drive screw, a bearing collar operatively associated with said axial drive screw and said secondary drive member, and a motor for driving said axial drive screw.

7. An apparatus as recited in claim 1, wherein said transmission assembly includes a series of intermeshed drive gears operatively connected to said turret and driven by a stepper motor.

8. An apparatus as recited in claim 1, wherein said plurality of tool assemblies is selected from the group of tool assemblies consisting of a sanding tool, a routing tool, a sawing tool, and a drilling tool.

9. An apparatus as recited in claim 1, further comprising a main drive motor housed within said supporting structure for delivering power to said primary drive member.

10. A machining apparatus comprising:
    a) a supporting structure mounted adjacent a work holding platform defining a substantially planar work surface;
    b) a turret operatively connected to said supporting structure and mounted to rotate relative to said work holding platform about an axis extending parallel to said planar work surface;
    c) a primary drive member operatively connected to said supporting structure and mounted to rotate about an axis extending perpendicular to said planar work surface;
    d) a plurality of tool assemblies supported on said turret in circumferentially spaced apart relationship, each tool assembly having a respective driven member operatively connected thereto which is mounted to rotate about an axis extending perpendicular to the axis of rotation of said turret;
    e) a secondary drive member configured to transmit rotational motion from said primary drive member to a selected one of said driven members frictionally engaged therewith, said secondary drive member mounted to translate along an axis extending perpendicular to the axis of rotation of said primary drive member, relative to said selected driven member, while remaining in frictional contact therewith, to vary the rotational speed of said driven member;
    f) a transmission assembly for effectuating the rotation of said turret relative to said planar working surface to align a selected one of said tool assemblies with said work holding platform and consequently engage a corresponding one of said driven members with said secondary drive member; and
    g) a linear drive assembly for effectuating the axial translation of said secondary drive member relative to said selected driven member.

11. An apparatus as recited in claim 10, wherein the rotational speed of a selected one of said driven members increases with respect to the rotational speed of the primary drive member as said secondary drive member translates radially inwardly from a peripheral edge of said driven member.

12. An apparatus as recited in claim 10, wherein said linear drive assembly includes an axial drive screw, a bearing collar operatively connected to said drive screw and said secondary drive member, and a motor for driving said drive screw.

13. An apparatus as recited in claim 10, wherein said plurality of tool assemblies is selected from the group of tool assemblies consisting of a sanding tool, a routing tool, a sawing tool, and a drilling tool.

14. An apparatus as recited in claim 10, wherein said transmission assembly includes a series of intermeshed drive gears operatively connected to said turret and driven by a stepper motor.

15. An apparatus as recited in claim 10, further comprising a main drive motor associated with said supporting structure for delivering power to said primary drive member.

16. A machining apparatus comprising:
a) a supporting structure housing a drive motor and mounted adjacent a work holding platform defining a substantially planar work surface;
b) an indexing turret disposed adjacent said supporting structure and mounted to rotate relative to said work holding platform about an axis extending parallel to said planar work surface;
c) a primary drive member operatively connected to said drive motor and mounted to rotate about an axis extending perpendicular to said planar work surface;
d) a plurality of tool assemblies removably supported on said indexing turret in circumferentially spaced apart relationship, each tool assembly having a respective driven member operatively connected thereto which is mounted to rotate about an axis extending perpendicular to the axis of rotation of said indexing turret;
e) a secondary drive member operatively connected to said supporting structure and configured to transmit rotational motion from said primary drive member to a selected one of said driven members, said secondary drive member mounted to translate along an axis extending parallel to the axis of rotation of said indexing turret, relative to said selected driven member and said primary drive member, while remaining in frictional contact therewith, to vary the rotational speed of said driven member;
f) a transmission assembly for effectuating the rotation of said indexing turret relative to said planar work surface to align a selected one of said tool assemblies with said work holding platform and consequently engage a corresponding one of said driven members with said secondary drive member; and
g) a linear drive assembly for effectuating the axial translation of said secondary drive member relative to said selected driven member and said primary drive member.

17. An apparatus as recited in claim 16, wherein said plurality of tool assemblies is selected from a group of tool assemblies consisting of a sanding tool, a routing tool, a sawing tool, and a drilling tool.

18. An apparatus as recited in claim 16, wherein said linear drive assembly includes an axial drive screw, a bearing collar operatively associated with said drive screw and said secondary drive member, and a motor for driving said drive screw.

19. An apparatus as recited in claim 16, wherein said transmission assembly includes a series of intermeshed drive gears operatively connected to said turret and driven by a stepper motor.

20. A drive assembly for a machine having a power source comprising:
a) a primary drive member operatively connected to the power source of said machine and mounted to rotate about a first axis of rotation;
b) a driven member mounted to rotate about a second axis of rotation which is parallel to said first axis of rotation; and
c) a secondary drive member configured to transmit rotational motion from said primary drive member to said driven member, said secondary drive member including means providing for rotative movement about and translation along an axially disposed linear drive screw extending perpendicular to said first and second axes of rotation, while remaining in frictional contact with said primary drive member and said driven member, to vary the rotational speed of said driven member.

21. A drive assembly as recited in claim 20, further comprising a linear drive assembly for effectuating the axial translation of said secondary drive member relative to said driven member and said primary drive member.

22. A drive assembly as recited in claim 20, wherein said primary drive member comprises a first friction disc having an annular planar contact surface.

23. A drive assembly as recited in claim 22, wherein said secondary drive member comprises a second disc having a circumferential peripheral contact surface.

24. A drive assembly as recited in claim 23, wherein said driven member comprises a third disc having an annular planar contact surface.

25. A drive assembly as recited in claim 23, wherein the circumferential peripheral contact surface of the second disc is provided with an elastomeric contact material.

26. A drive assembly as recited in claim 20, wherein said power source comprises an electric drive motor.

27. A drive assembly for a machine having a power source comprising:
a) a primary driver operatively connected to the power source of said machine and mounted to rotate about a first axis of rotation;
b) a driven member supported adjacent said primary driver and mounted to rotate about a second axis of rotation; and
c) a secondary drive member configured to transit rotational motion from said primary driver to said driven member, said secondary drive member including means providing for linear translation with respect to the axis of rotation of said driven member, along an axially disposed linear drive screw extending therethrough, said means further providing for rotative movement of said secondary drive member about said drive screw, while remaining in frictional contact with said driven member and said primary driver to vary the rotational speed of said driven member.

28. A drive assembly as recited in claim 27, wherein said primary driver comprises a driving friction disc mounted on a rotating drive shaft.

29. A drive assembly as recited in claim 27, wherein said secondary drive member comprises a driven friction disc mounted to rotate about and translate along an axis extending perpendicular to said first and second axes of rotation.

30. A drive assembly as recited in claim 27, wherein said second axis of rotation is parallel to said first axis of rotation.

* * * * *